United States Patent Office 3,205,068
Patented Sept. 7, 1965

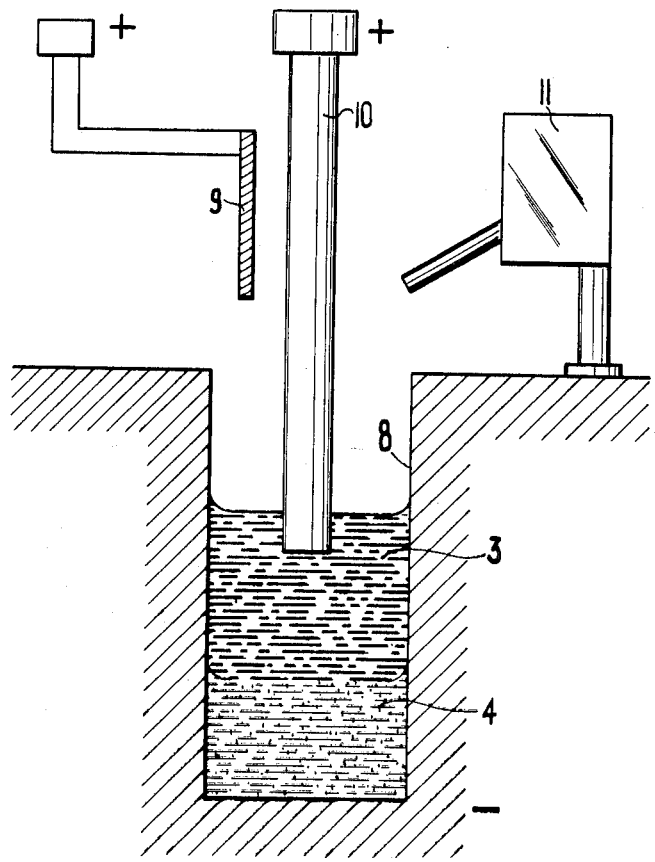

3,205,068
PROCESS FOR THE PURIFICATION OF URANIUM AND PARTICULARLY IRRADIATED URANIUM
Jean Erler, Grenoble, Robert Péray, Montay par Bures sur Yvette, and Jean Petit, Villejuif, France, assignors to Commissariat a l'Energie Atomique, Paris, France
Filed Mar. 8, 1962, Ser. No. 178,479
Claims priority, application France, Mar. 18, 1961, 856,050
3 Claims. (Cl. 75—84.1)

The present invention relates to processes for the treatment of fissionable metals with a view to their purification, and particularly the treatment of irradiated uranium for the purpose of separating this latter from its fission products, that is to say in order to effect the decontamination thereof.

The chief object of the present invention is to make these processes more effective than has hitherto been achieved, by producing a higher yield of pure metal and at higher rates of decontamination.

The invention is mainly characterized in that—assuming, for example, that it is required to separate uranium from its impurities, especially from fission products—the uranium is melted by any appropriate means under a thermodynamically stable slag which is compatible with uranium and which remains liquid at a temperature which is lower than the melting temperature of uranium, the whole molten mass being then cooled to a temperature which is comprised between the melting temperature of the slag and that of uranium, the solid purified uranium being then separated by any appropriate method from the liquid slag which contains the impurities eliminated, in particular the fission products.

Apart from this principal arrangement the invention comprises certain other arrangements which are preferably employed at the same time and which will be explained in greater detail below, namely: a second arragement which relates in a general manner to methods of separating from a metal or alloy by combining with an appropriate slag certain impurities which are eliminated with the molten slag, and which consists in carrying out the melting operation under an electric arc, the metal to be purified being employed as a consumable electrode.

The present invention is more especially directed to certain modes of application as well as to certain forms of embodiment of the said arrangements; and it is concerned even more especially, and by way of new industrial products, with those devices which are intended for the practical operation of the processes of the type mentioned and which comprise the application of these same arrangements as well as the special elements designed for their construction and the parts treated or obtained by means of the said processes and devices.

The invention will in any case be made clear with reference to the complementary description which follows below as well as the accompanying drawing, it being understood that the said complementary description and drawing are given chiefly by way of indication.

The single figure of the said drawing shows diagrammatically and in vertical cross-section a device for the treatment of irradiated uranium and constructed in accordance with the invention.

In accordance with the present invention, and more especially in accordance with preferred methods of application thereof and preferred forms of embodiment of the various constituent elements, and given that, for example, irradiated uranium slugs are provided with a view to carrying out a decontamination treatment, that is to say to separating the fission products, the method of operation is carried out as follows or in like manner.

It is useful to recall in this connection that it has already been suggested to effect this decontamination treatment by pyrometallurgy by melting the irradiated metal in an oxide crucible (especially a crucible of magnesium oxide MgO or of zirconium oxide $ZrO_2$), the fission products being oxidized by the crucible and forming a dross which adheres to the crucible or which floats on the surface of the molten metal, which is then separated for the purpose of being used again in a pile.

This process produces, however, a poor yield especially as a result of inclusions of uranium metal in the dross residues; in addition, the reaction takes a long time and is difficult to control.

In order to provide a remedy for these drawbacks, the expedient employed in accordance with the invention is a treatment in a crucible with addition of a slag which is suitably chosen in such manner as to dissolve the dross residues without reacting on the uranium and of such nature that the said slag is liquid at a temperature which is lower than the melting temperature of the uranium.

In order that the said slag should be compatible with the uranium, it is necessary to ensure that it has great thermodynamic stability and to ensure especially that it is more stable than the corresponding uranium compound, thereby making it necessary to adopt slags which are non-volatile and having a melting point varying between 1000° C. and 1130° C., that is to say slightly below that of uranium (1132° C.).

It seems that one of the most suitable constituents is beryllium oxide BeO or glucina, on the understood condition that it is usually necessary, however, to form binary or ternary compounds which are preferably nearly eutectic and in which the constituents other than glucina can be chosen especially in the group of oxides of barium, strontium, calcium, lithium, lanthanum (BaO, SrO, CaO, $Li_2O$, $La_2O_3$).

As far as the proportions of these constituents are concerned, it appears possible to employ up to 50% of glucina (BeO), although as a rule this proportion can be lower. Accordingly, when a mixture of BeO, BaO, $La_2O_3$ is adopted, the percentage of BeO can be of the order of only 10%, with 83% of BaO and 7% of $La_2O_3$, this composition proximating to that of the ternary eutectic mixture BeO, BaO, $La_2O_3$, the melting temperature of which is 1110° C.

It is possible to employ a slag formed by a mixture of BeO, BaO, CaO containing 9.36% of BeO, 80.64% of BaO and 10% of CaO, this composition being proximate to that of the ternary eutectic mixture BeO, BaO, CaO, the melting temperature of which is 1115° C.

It must be noted that the presence of such slags has the further advantage of eliminating the non-metallic impurities from the uranium, in particular oxygen and carbon, so that in the presence of BeO and CaO, the oxygen content rapidly decreases to a few parts per million (4 to 8) irrespective of the initial content, while the carbon content can fall from 260 parts per million to 160 parts per million in one hour.

It is also advantageous to add a certain proportion of uranium oxide $UO_2$, for example 4%, this addition having for its object to reduce the solubility of the uranium in the slag and to increase to a substantial extent the decontamination factor without thereby modifying the melting temperature of the eutectic mixture to which the said uranium oxide is added.

It is naturally advisable to choose a vessel or crucible which offers sufficient resistance to the uranium and the slag. It appears expedient to employ for this purpose a crucible of known type, and either of beryllium oxide or glucina, since the enriching of the slag with BeO does not result in any disadvantage. However, a crucible of copper or like metal can also be employed when provision is made for suitable cooling of this latter by water-cooling means or the like.

Insofar as concerns the actual melting process, the method of operation can be carried out in many ways which can differ from each other, especially in the nature of the heating sources employed, on the understood condition that it is possible to have recourse in particular to electric heating by means of a heating resistance or to induction heating or electric-arc heating, the irradiated slug being used in certain cases as the electrode.

By way of example, a number of suitable forms of embodiment which it is possible to adopt are given hereunder:

(a) In accordance with a first form of embodiment (which is the case, for example, of a slag of the type BeO, BaO, SrO with addition, for example, of a certain quantity of uranium oxide) the whole mass is first melted then cooled to 1100° C. in order to solidify the uranium. This being effected, the slag is poured off by tilting so as to be separated-out, following which the uranium is reheated to 1200° C. so that the uranium can also be withdrawn from the crucible by melting and pouring off.

(b) In accordance with another form of embodiment, the operation is carried out in the same manner but by replacing the glucina crucible by a water-cooled copper crucible while heating is effected, for example, by high-frequency induction and the operations can be carried into effect as indicated in paragraph (a) above.

(c) In accordance with yet another form of embodiment, there is employed a consumable electrode which is constituted by the irradiated uranium slug itself, the operation being conducted in an argon atmosphere and in an ingot-mould of cooled copper.

It is understood that this latter process, which consists in making use of a consumable electrode made of that metal or alloy which it is intended to purify could be applied in a general manner and within the scope of the present invention to metallurgical purification or refining even outside the field of fissionable or irradiated metals.

The operation consists preferably in effecting first of all the melting of the slag, then in immersing the electrode, the fusion of this latter in the slag being maintained by virtue of the Joule effect.

In this latter case, the metal passes through the slag in the form of fine droplets which provide a large exchange surface and thus permit of a rapid operation.

It is understood that the forms of embodiment a, b, c, are given only by way of indication and that many other forms of embodiment can be devised by those skilled in the art.

Lastly, there follows below a more concrete example of practical application in connection with the form of embodiment (c) referred to above.

*Example*

In an electric-arc furnace filled with argon under one atmosphere, there is placed a water-cooled ingot-mould 8 of copper, a tungsten electrode 9 and a lanthanum uranium electrode 10 having 0.5% of lanthanum and a diameter of 10 millimetres, as shown in the single figure of the accompanying drawing.

The slag 3, which is, for example, of the type BeO, BaO, $La_2O_3$, is progressively melted by means of an electrode 9 of tungsten, the supply of slag being effected by means of a vibratory device 11. Then the uranium electrode 10 is immersed in the slag and melted by virtue of the Joule effect so as to form a pool 4 of molten uranium, the yield obtained in the pouring process being of the order of 99.5%.

In the accompanying drawing, the terminals + and − have been given only by way of indication in order to show that the furnace employed is of the electric-arc type.

In consequence thereof, irrespective of the form of embodiment adopted, it is possible in particular to effect the decontamination of the irradiated uranium whatever may be the irradiation factor; and the process in accordance with the invention accordingly offers a large number of advantages over the methods of the prior art referred to above, in particular:

That of permitting the achievement of a higher pouring yield with a good decontamination factor as compared with other pyrometallurgy processes;

That of permitting the performance of rapid reactions since they take place between liquid phases;

That of permitting of the production of waste products in a compact form, that is to say in their final form in which they are ready for storage;

And lastly that of permitting the composition of the slag to be easily adjusted as a function of the composition of the uranium alloy to be treated.

The melting or fusion with a consumable electrode is found to be particularly advantageous and could apply to other fields; the processing method using slags could be applied to various alloys, particularly uranium-molybdenum, and to the purification of products, even non-fissile products as beryllium.

As will be readily understood and as it already follows in any case from the foregoing description, the present invention is in no way limited to those modes of application or to those forms of embodiment of the various elements thereof which have been more especially contemplated, but on the contrary includes within its scope all alternative forms.

What we claim is:

1. Process for the purification of irradiated uranium, in which the uranium to be purified is melted under a thermodynamically stable slag consisting of a plurality of oxides forming a nearly eutectic composition which is compatible with uranium and which remains liquid at a temperature which is lower than the melting temperature of uranium, the whole molten mass being then cooled to a temperature between the melting temperature of the slag and that of uranium to solidify the uranium, the solid purified uranium then being separated from the liquid slag which contains as impurities the fission products to be eliminated.

2. Process for the purification of uranium in accordance with claim 1, in which the said slag is constituted by a nearly eutectic composition of beryllium oxide and at least one of the oxides which have high thermodynamic stability selected from the group consisting of the oxides of barium, calcium, strontium, magnesium, lithium and lanthanum, with addition of a small quantity of uranium dioxide on the order of 5% by weight.

3. In a process for the purification of uranium, the steps of melting an electrode of uranium to be purified in a liquid thermodynamically stable slag consisting of a plurality of oxides forming a nearly eutectic composition compatible with uranium maintaining the slag molten by a second electrode at a temperature which is lower than the melting temperature of uranium, cooling the molten mass to a temperature between the melting temperature of the slag and the melting temperature of uranium to solidify the uranium and then separating the solid purified uranium from the liquid slag, the liquid slag containing as impurities the fission products to be removed from the uranium.

References Cited by the Examiner

UNITED STATES PATENTS

| | | | |
|---|---|---|---|
| 2,782,245 | 2/57 | Preston | 13—9 |
| 2,959,630 | 11/60 | Reschke | 13—9 |
| 3,029,142 | 4/62 | Coffinberry | 75—84.1 |
| 3,034,889 | 5/62 | Spedding et al. | 75—84.1 |

FOREIGN PATENTS 589,122  12/59  Canada.

OTHER REFERENCES

Nuclear Science & Engineering, vol. 2, pp. 408, 409, 416–419, 423 and 424, August 1957.

CARL D. QUARFORTH, *Primary Examiner.*

REUBEN EPSTEIN, OSCAR R. VERTIZ, *Examiners.*